United States Patent [19]

Chikama

[11] Patent Number: 4,987,448
[45] Date of Patent: Jan. 22, 1991

[54] SKEWING DETECTION MECHANISM FOR PRINTER EMPLOYING CONTINUOUS RECORDING FORM

[75] Inventor: Atsushi Chikama, Tokyo, Japan

[73] Assignee: Asahi Kogaku Kogyo Kabushiki Kaisha, Tokyo, Japan

[21] Appl. No.: 315,120

[22] Filed: Feb. 24, 1989

[30] Foreign Application Priority Data

Feb. 24, 1988 [JP] Japan .............................. 63-23587[U]
Nov. 8, 1988 [JP] Japan ............................ 63-145706[U]

[51] Int. Cl.⁵ ............................................ G03G 21/00
[52] U.S. Cl. ................................... 355/205; 250/561; 271/261; 355/202; 355/206; 355/316
[58] Field of Search ............... 355/205, 206, 207, 316, 355/311, 212, 311, 316, 202; 226/18-23; 340/675, 676; 242/57.1; 198/810; 250/561; 271/110, 259, 261, 265

[56] References Cited

U.S. PATENT DOCUMENTS

| | | | |
|---|---|---|---|
| 3,119,535 | 1/1964 | Hoffman | 226/23 |
| 3,380,637 | 4/1968 | Knapp | 226/21 X |
| 4,298,270 | 11/1981 | Tsuda et al. | 355/311 |
| 4,684,235 | 8/1987 | Kohmoto et al. | 355/316 |
| 4,804,979 | 2/1989 | Kamas et al. | 346/157 |
| 4,859,860 | 8/1989 | Poterala | 250/561 X |
| 4,924,266 | 5/1990 | Negoro et al. | 355/205 |

Primary Examiner—A. T. Grimley
Assistant Examiner—Matthew S. Smith
Attorney, Agent, or Firm—Sandler, Greenblum & Bernstein

[57] ABSTRACT

A skewing detection mechanism for a printer of type wherein an image is formed onto a continuous recording form. A pivotally movable sensor is arranged in abutted and biased relation to the continuous recording form being transported along a predetermined transport path. A detector is provided for detecting pivotal movement of the sensor.

18 Claims, 5 Drawing Sheets

SKEWING DETECTION MECHANISM FOR PRINTER EMPLOYING CONTINUOUS RECORDING FORM

BACKGROUND OF THE INVENTION

This invention relates to a skewing detection mechanism for a printer of the type wherein an image is formed onto a continuous recording form, for detecting transport malfunctions, such as skewing, meandering, tearing-up and the like of the continuous recording form.

Conventionally, there is known an image recording apparatus utilizing a so-called electrophotographic system in which a surface of a photoconductive drum, for example, is exposed to light to form a latent image on the drum surface, toner is then applied to the latent image to develop the same, and the developed image is transferred onto a recording medium and is fixed by a fixing unit. Such image recording apparatus is chiefly employed in a copying machine. In general, cut sheets are used as the recording medium.

In recent years, the image recording apparatus utilizing the electrophotographic system has also been employed in a printer or the like which prints the output from a computer. In such image recording apparatus, it has been desired to use, as the recording medium, a continuous recording form identical with that used in a conventional line-printer.

The continuous recording form is a folded continuous form (hereinafter referred to simply as "continuous form") called a fan-folded form which has formed therein sprocket holes. Perforations are provided at each of the folded sections to enable sheet sections to be easily severed from each other.

As a method of fixing a toner image onto the recording medium in the above electrophotographic system, there are various systems including a system due to heat fusion, a system due to solvent, a system due to pressure, and the like. The system due to heat fusion has generally been utilized, because the heat-fusion system is considered most effect in terms of safety and reliability. The heat-fusion system includes various specific ways. Among the heat-fusion ways, a so-called heat-roll fixture is most often employed, in which a recording medium having carried thereon an unfixed toner image is abutted and urged against a heated roller or a heat roller so that the toner is heated and fused due to heat applied by the heat roller.

In the heat-roll fixture, a high temperature heat roller and a backup roller are arranged in parallel relation to each other to form a fixing roll pair. The recording medium having carried thereon unfixed toner image is clamped between the rollers of the fixing roll pair, so that the recording medium is urged against the heat roller with a predetermined pressure and is heated by the heat roller. Usually, it is designed so that the recording medium is driven to travel by rotation of the fixing roll pair.

The above heat-roll fixture is also frequently employed in electrophotographic type printers utilizing a continuous form as the recording medium.

When the above heat-roll fixture is applied to the printer of the electrophotographic type printer employing a continuous form recording medium, the following problem arises. Because the continuous form is driven to travel by the fixing roll pair, the continuous form clamped between the rollers of the fixing roll pair would skew or meander due to various factors such as poor initial biting of the continuous form into the nip between the fixing rollers, unevenness or nonuniformity in thickness of the continuous form, elongation of the continuous form due to absorption of moisture, and the like. If such skewing or meandering occurs, the biting position of the continuous form with respect to the fixing rollers consecutively varies laterally, so that the side edge of the continuous form finally reaches the lateral end of the nip between the fixing rollers. This causes creases in the continuous form, resulting in defective fixing of the image and in a transport malfunction called jamming of the continuous form.

Further, the above-described defective fixing and transport malfunction occur also in a general or usual traveling drive mechanism for the continuous form. Specifically, the traveling drive mechanism comprises a pair of endless belts which are arranged respectively at opposite side edges of the continuous form. Each of the endless belts is provided with a plurality of projections which are engageable with sprocket holes formed in a corresponding one of the opposite side edges of the continuous form. The endless belts are driven to transport the continuous form. In this traveling drive mechanism, defective fixing and transport malfunctions occur due to a difference between the speed of the continuous form transported by the endless belts and the effect of traveling of the continuous form driven by the fixing rollers.

The above skewing or meandering of the continuous form does not occur in the case of cut sheets, because the cut sheets are limited in length, i.e., are relatively short in length.

SUMMARY OF THE INVENTION

It is therefore an object of the present invention to provide an improved skewing detection mechanism for a printer employing a continuous recording form, capable of rapidly detecting transport malfunctions such as skewing, meandering and the like, thereby enabling the printer to be stopped in printing and/or enabling the occurrence of malfunctions to be displayed to inform a user of the malfunctions.

For the above purpose, according to the invention, there is provided a skewing detection mechanism for a printer of the type wherein an image is formed onto a continuous recording form, which comprises:

a pivotally movable sensor means arranged in abutted and biased relation to the continuous recording form being transported along a predetermined transport path; and means for detecting pivotal movement of the sensor means.

BRIEF DESCRIPTION OF THE ACCOMPANYING DRAWINGS

DESCRIPTION OF THE EMBODIMENTS

Figure 1:
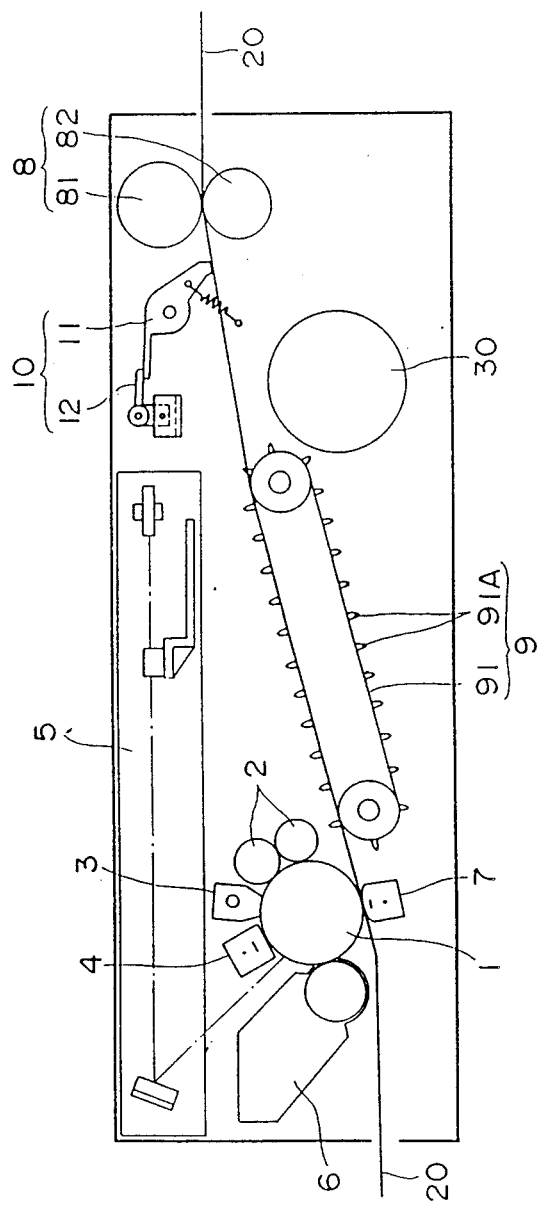
FIG. 1 is a schematic side elevational view of a printer employing a continuous recording form, the printer having incorporated therein a skewing detection mechanism embodying the invention.

Referring to FIG. 1 there is illustrated a laser beam printer in which a fan-folded form 20 is used as a continuous recording form. The laser beam printer is designed to print information outputted from a computer or the like, onto the fan-folded form 20 by means of an electrophotographic system, and to output the printed information.

The printer comprises a photoconductive drum 1. Arranged about the photoconductive drum 1 in order, in the rotational direction thereof, are a toner-cleaning station 2, a de-charging station 3, a charging station 4, an optical scanning system 5 for leading a laser beam onto the photoconductive drum 1, a developing station 6, and a transferring station 7. A fixing station 8 is arranged downstream of the photoconductive drum 1 with reference to a transport direction in which the fan-folded form 20 travels along a predetermined transport path. A tension applying mechanism 9 is arranged on the predetermined transport path at a location between the photoconductive drum 1 and the fixing station 8. A skewing detection mechanism 10 is arranged above a portion of the fan-folded form 20 extending between the tension applying mechanism 9 and the fixing station 8.

The arrangement is such that the laser beam from the optical scanning system 5 scans the charged surface of the drum 1 along an axis thereof to carry out a main scanning, and the drum 1 is rotated to carry out an auxiliary scanning, thereby forming a latent image on the charged drum surface. Toner is then applied at the developing station 6 to the latent image to develop the image. Subsequently, the developed toner image is transferred at the transferring station 7 onto the fan-folded form 20, and the transferred toner image is fixed at the fixing station 8. The fan-folded form 20 having carried thereon the fixed image, is outputted from the printer.

At the fixing station 8, a fixing roll pair is arranged which is composed of an upper heat roller 81 and a lower backup roller 82 having their respective axes extending perpendicularly to the transport direction of the fan-folded form 20. A gap, defined between the outer peripheral surfaces of the respective upper and lower rollers 81 and 82, is set so that when the fan-folded form 20 is clamped between the rollers 81 and 82, the fan-folded form 20 is compressed with a predetermined pressure.

The upper heat roller 81 is freely rotatable and has incorporated therein a heat generating unit, such as a halogen lamp or the like, so that the upper heat roller 81 is heated to a predetermined temperature.

The lower backup roller 82 is connected to a drive motor 30 through a chain (not shown). The lower backup roller 82 is rotatively driven by the drive motor 30 at a peripheral velocity in synchronism with that of the photoconductive drum 1.

The upper and lower rollers 81 and 82 cooperate with each other to clamp the fan-folded form 20, carrying the toner image, thereby compressing the fan-folded form 20 with the predetermined pressure. The heat roller 81 heats the fan-folded form 20 to fuse the toner image onto the fan-folded form 20. The upper and lower rollers 81 and 82 also cooperate with each other to drive the fan-folded form 20, carrying the fixed image, to travel along the predetermined path, thereby discharging the fan-folded form 20 out of the printer. Thus, the fixing roll pair also serves as a transport mechanism for the fan-folded form 20.

Figure 2:
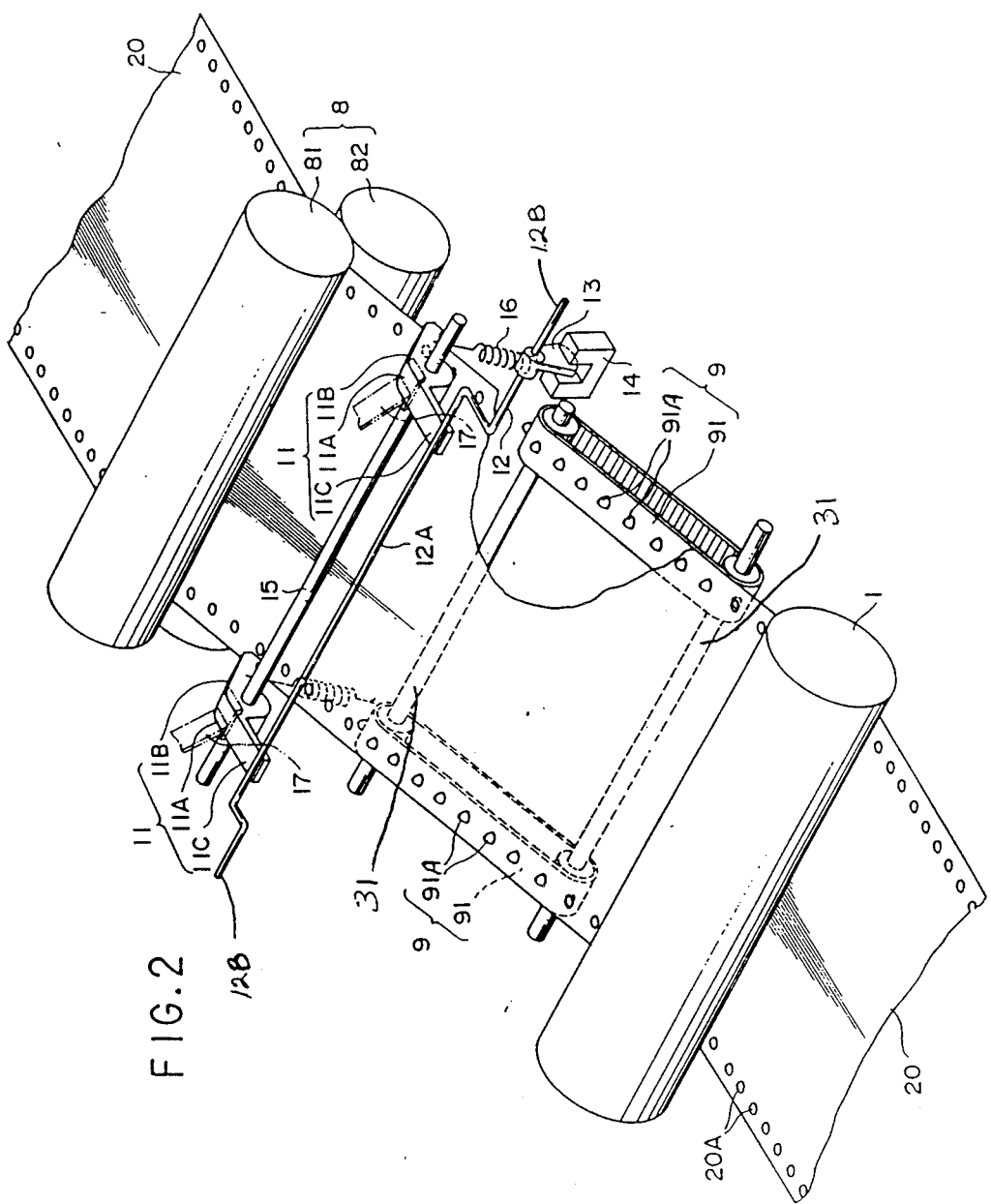
FIG. 2 is an enlarged perspective view of the skewing detection mechanism.

The tension applying mechanism 9 comprises a pair of endless tension belts 91 as clearly shown in FIG. 2. The endless belts 91 are arranged below the fan-folded form 20, traveling from the transferring station 7 toward the fixing station 8 along the predetermined transport path. The endless belts 91 extend parallel to the transport path, respectively, along opposite side edge portions of the fan-folded form 20. Each of the endless belts 91 is adapted to run with a predetermined resistance in the transport direction of the fan-folded form 20. The endless belts 91 are so arranged as to have their respective upper runs extending in coplanar relation to the transport path of the fan-folded form 20. A plurality of projections 91A are formed on an outer peripheral surface of each of the endless belts 91. The projections 91A are arranged in a single row along the entire periphery of the endless belt 91, and are spaced from each other equidistantly so that the projections 91A are engageable, respectively with sprocket holes 20A (see FIG. 3) formed along a corresponding one of the opposite side edge portions of the fan-folded form 20. Thus, the endless belts 91 are driven to travel by movement or transportation of the fan-folded form 20. The running resistance of the respective endless belts 91 serve to apply a tension to the portion of the fan-folded form 20 extending between the tension applying mechanism 9 and the fixing station 8, thereby preventing the occurence of skewing or meandering of the fan-folded form 20, and also thereby restoring the fan-folded form 20 automatically to the regular position even if such skewing or meandering occurs.

The pair of endless belts 91 extend between a pair of shafts 31, and are mounted on the shafts 31 for movement therealong in such a manner that the distance between the endless belts 91 can be adjusted by an adjusting mechanism (not shown) to meet the width of the fan-folded form 20. Thus, the pair of endless belts 91 can handle fan-folded forms having different widths.

The aforesaid skewing detection mechanism 10 is arranged above the portion of the fan-folded form 20 extending between the tension applying mechanism 9 and the fixing station 8.

As shown in detail in FIG. 2, the skewing detection mechanism 10 comprises a shaft 15 having an axis extending perpendicularly to the transport direction of the fan-folded form 20. A pair of pickups 11 are arranged, respectively above the opposite side edge portions of the fan-folded form 20, and are mounted on the shaft 15 for pivotal movement about the axis thereof. The arrangement is such that pivotal movement of one or both of the pickups 11 causes a crank bar 12 to be moved angularly about a common axis of opposite axial end portions 12B of the crank bar 12, and a shutter plate 13 fixedly connected to one of the axial end portions 12B, is pivotally moved about the common axis between an inoperative position within a detecting region of a photo-interrupter 14 and an operative position out of the detecting region thereof.

Specifically, each of the pair of pickups 11 comprises a boss 11A having a predetermined diameter and a predetermined thickness or width along the axis of the shaft 15. A sensing arm 11B and a push arm 11C extend from an outer periphery of the boss 11A in their respective directions substantially opposite to each other. The pickup 11 is mounted on the shaft 15 for pivotal movement about the axis thereof and for sliding movement along the axis of the shaft 15. In this manner, the pickups 11 are slidable along the axis of the shaft 15 so that a distance between the pickups 11 can be so adjusted as to be matched to various continuous forms that are different in width. A coil spring 16 is associated with the sensing arm 11B for biasing the same toward the fan-folded form 20 in such a manner that a forward end face of the sensing arm 11B is abutted against a corresponding one of the opposite side edge portions of the fan-folded form 20.

Figure 3:
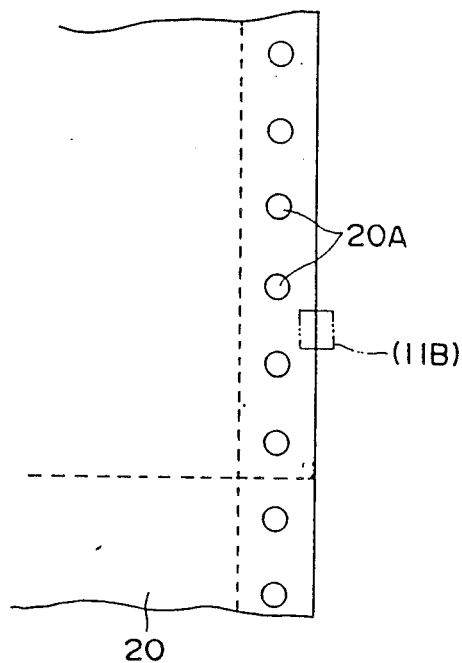
FIG. 3 is a fragmentary top plan view of the continuous recording form, showing the positional relationship between a forward end face of a sensing arm and a side edge of the continuous recording form.

As indicated by the double-dotted lines in FIG. 3, substantially a half part of the forward end face of the sensing arm 11B is abutted against the corresponding side edge portion of the fan-folded form 20, while the remaining half part of the forward end face extends outwardly from the side edge of the corresponding side edge portion of the fan-folded form 20. Abutment of the forward end face of the sensing arm 11B against the corresponding side edge portion of the fan-folded form 20 prevents the pickup 11 from being pivotally moved about the axis of the shaft 15.

Referring back to FIG. 2, the pair of pickups 11 are connected to the aforesaid adjusting mechanism for the pair of endless belts 91, through respective arms 17, in such a manner that the pickups 11 move along the shaft 15 in synchronism with the movement of the endless belts 91 along the shafts 31 for the purpose of adjustment of the distance between the endless belts 91 to meet the width of the fan-folded form 20. Thus, it is possible to bring the sensing arms 11B of the respective pickups 11 to their respective predetermined detecting positions at the respective side edge portions of the fan-folded form 20.

The crank bar 12 is composed of the opposite axial end portions 12B, extending along the common axis and an eccentric shaft section 12A extending between the axial end portions 12B. The axial end portions 12B are rotatably mounted, respectively, to opposite side walls of a frame (not shown) of the printer. When the crank bar 12 moves angularly about the common axis of the opposite axial end portions 12B, the eccentric shaft section 12A moves so as to generate an arcuate surface having a predetermined radius of curvature. The eccentric shaft section 12A rests under gravity upon the push arms 11C of the respective pickups 11 and 11.

As previously described, the axial end portions 12B of the crank bar 12 are rotatably supported, respectively, by the opposite side walls of the frame (not shown) of the printer, and the shutter plate 13 is fixedly mounted to one axial end portion 12B for pivotal movement about the the common axis of the opposite axial end portions 12B. Thus, it will be seen that the crank bar 12 constitutes a transmission mechanism for transmitting pivotal movement of one or both of the pickups 11 to the shutter plate 13.

The shutter plate 13 is so arranged as to cross the detecting region of the photo-interrupter 14, which is fixed in position to the one side wall of the frame (not shown). As previously described, the shutter plate 13 is movable between the inoperative position within the detecting region of the photo-interrupter 14 and the operative position out of the detecting region thereof. Normally, the shutter plate 13 is in the inoperative position where presence of the the shutter plate 13 is detected by the photo-interrupter 14.

The photo-interrupter 14 is composed of a light source and a light receiving element which are arranged in facing relation to each other with a predetermined spacing left therebetween. Presence and absence of an interrupting object or the shutter plate 13 between the light source and the light receiving element, that is, within the detecting region of the photo-interrupter 14 are detected on the basis of presence and absence of an output signal from the light receiving element.

The skewing detection mechanism 10 constructed as above operates in a manner described below to detect occurrence of transport malfunctions such as skewing, meandering, tearing-up and the like of the fan-folded form 20.

When the forward end faces of the sensing arms 11B of the respective pickups 11 are abutted under the biasing forces of the respective coil springs 16, respectively, against the opposite side edge portions on the upper side of the fan-folded form 20, the shutter plate 13 fixedly mounted to one axial end portion 12B of the crank bar 12, having its eccentric shaft section 12A resting upon the push arms 11C of the respective pick ups 11, intersects the detecting region of the photo-interrupter 14. That is, the shutter plate 13 is in the inoperative position and is detected by the photo-interrupter 14. This indicates that the fan-folded form 20 is transported normally.

Supposing, for instance, that the fan-folded form 20 skews to the right, i.e., toward the right-hand pickup 11 as viewed in FIG. 2. As the forward end face of the sensing arm 11B of the left-hand pickup 11 is released from abutment against the left-hand side edge portion of the fan-folded form 20, the left-hand pickup 11 is pivotally moved under the downward biasing force of the coil spring 16, thereby causing the push arm 11C to lift the eccentric shaft section 12A of the crank bar 12 up. As a result, the crank bar 12 is moved angularly about the common axis of the axial end portions 12B such that the shutter plate 13 fixedly mounted to the one axial end portion 12B of the crank bar 12 is moved pivotally about the common axis of the axial end portions 12B to the operative position where the shutter plate 13 is out of the detecting region of the photo-interrupter 14. Thus, the photo-interrupter 14 outputs a signal representative of angular movement of the shutter plate 13 out of the detecting region of the photo-interrupter 14. The signal from the photo-interrupter 14 serves as a transport-malfunction detecting signal.

If the fan-folded form 20 is torn up for some reason, both pickups 11 are pivotally moved about the axis of the shaft 15 under the biasing forces of the respective coil springs 16, so that a transport-malfunction detecting signal is outputted from the photo-interrupter 14 in a manner like that described above with reference to skewing of the fan-folded form 20.

The transport-malfunction detecting signal outputted from the photo-interrupter 14 in the manner described above is inputted to a controller (not shown) of the printer. On the basis of the transport-malfunction signal from the photo-interrupter 14, the controller stops printing, as well as transporting the fan-folded form 20, and/or causes a display unit (not shown) of the printer to display an occurrence of the transport malfunction, thereby informing a user of this fact.

It is to be understood that the transmission mechanism, by which pivotal movement of one or both of the pickups 11 is transmitted to the shutter plate 13, is not limited to the illustrated one, but can be suitably modified. Further, it is needless to say that means for detecting movement of the shutter plate 13 is not limited to the photo-interrupter 14, but may use a microswitch of contact-type or non-contact type, or any other suitable switches.

Figure 4:
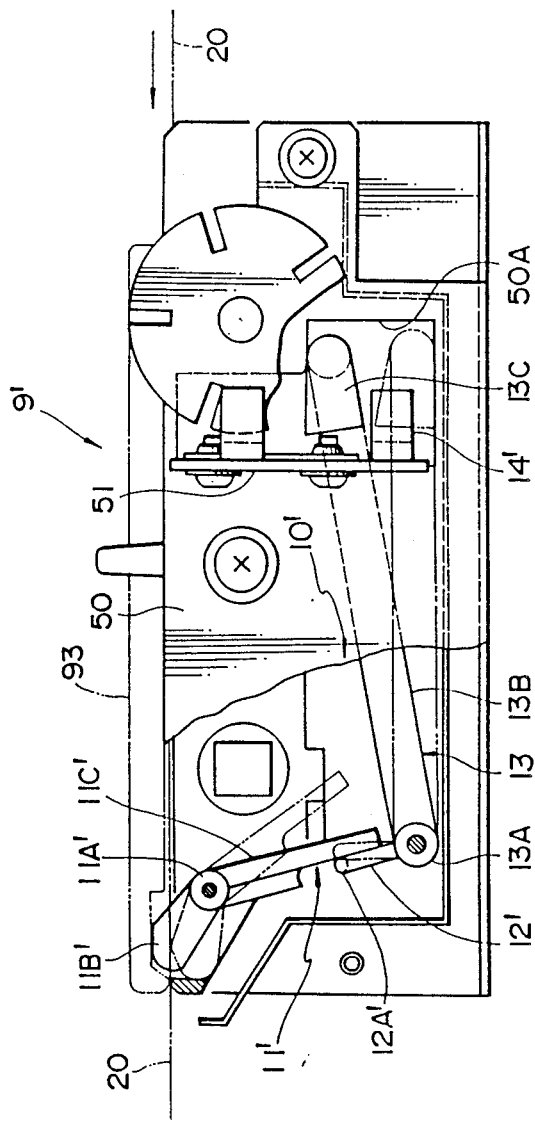
FIG. 4 is a side elevational view of a modified form of the skewing detection mechanism embodying the invention.
Figure 5:
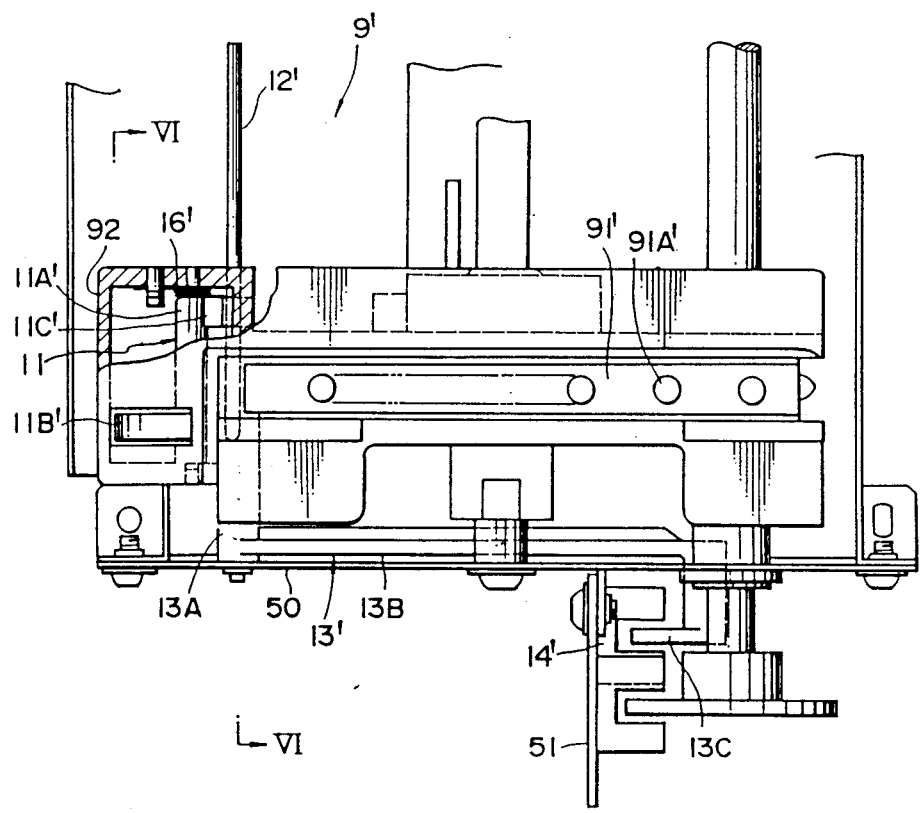
FIG. 5 is a partially broken-away, top plan view of the skewing detection mechanism illustrated in FIG. 4.
Figure 6:
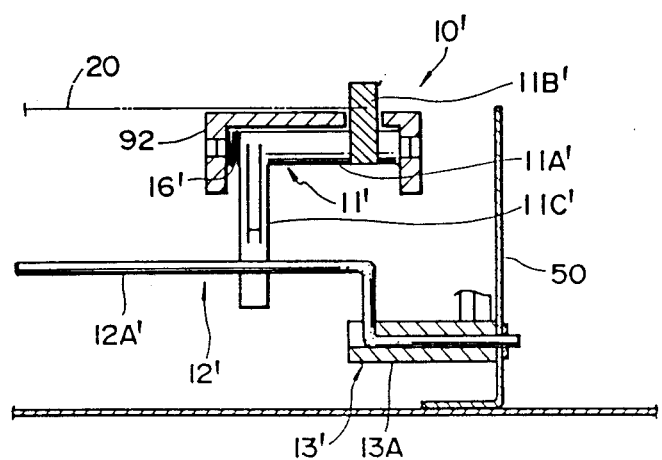
FIG. 6 is a fragmentary cross-sectional view taken along the line VI—VI in FIG. 5.

Referring next to FIGS. 4 through 6, there is shown a modified form of the skewing detection mechanism embodying the invention.

The modified skewing detection mechanism comprises a pair of tractor belt units 9' which are arranged at their respective positions where tension applying mechanisms 9 are arranged in the embodiment illustrated in FIG. 1 through 3. A skewing detection mechanism 10' is associated with the tractor belt units 9'. It is to be understood that, although the pair of tractor belt units 9' are arranged, respectively, at the opposite side edges of the fan-folded form 20 in the same manner as the previously described embodiment, only one of the pair of tractor belt units 9' and its associated component parts will chiefly be described below, for purposes of simplification.

FIG. 4 is a side elevational view of the tractor belt unit 9'. The fan-folded form 20 is driven to travel from the right to the left as viewed in FIG. 4, contrary to the previous embodiment.

The tractor belt unit 9' comprises an endless belt 91' (see FIG. 5) like the endless belt 91 of the previous embodiment. The endless belt 91' passes around a pair of spaced pulleys (not shown) such that the endless belt 91' is capable of running about the pulleys. The endless belt 91' is formed with projections 91A' which are engageable with the sprocket holes formed in the fan-folded form 20 to be transported. One of the pulleys, around which the endless belt 91' passes, is rotatively driven by driving means (not shown) arranged at an upper location as viewed in FIG. 5, which is a top plan view of FIG. 4. The endless belt 91' is driven to travel by rotation of the pulley driven by the driving means.

The pair of tractor belt units 9' are arranged, respectively, at the opposite side edges of the fan-folded form 20 in such a manner that the traveling direction of each endless belt 91' coincides with the transport direction of the fan-folded form 20. The endless belts 91' are driven to travel with their projections 91A' engaged with the sprocket holes in the fan-folded form 20, whereby the fan-folded form 20 is driven to travel at a predetermined speed.

In connection with the above, the pair of tractor belt units 9' are moveable toward and away from each other so that the spacing between the tractor belt units 9' can be adjusted to meet the width of the fan-folded form 20.

As shown in FIG. 6, which is a cross-sectional view taken along the line VI—VI in FIG. 5, a pickup 11' is mounted to a frame 92 of the tractor belt unit 9' for pivotal movement relative to the frame 92 about an axis that is perpendicular to the transport direction of the fan-folded form 20. It is needless to say that a similar pickup is provided also at the other tractor belt unit.

The pickup 11' is composed of a columnar boss 11A', a sensing arm 11B' and a push arm 11C'. The sensing arm 11B' and the push arm 11C' are formed, respectively, at opposite ends of the boss 11A' so as to project therefrom in directions substantially opposite to each other. A torsion spring 16' is arranged about one end of the boss 11A' to bias the pickup 11' in the clockwise direction as viewed in FIG. 4. That is, the pickup 11' is biased by the torsion spring 16' such that the sensing arm 11B' is pivotally moved upwardly.

The frame 92 has an upper surface which coincides with the transport path of the fan-folded form 20, and the fan-folded form 20 is transported while being in sliding contact with the upper surface of the frame 92. In this connection, the endless belt 91' is mounted to the frame 92 in such a manner that the upper run of the endless belt 91' coincides with the upper surface of the frame 92.

The frame 92 is formed with an opening above the pickup 11', through which the sensing arm 11B' can project from the upper surface of the frame 92. The sensing arm 11B' projects upwardly through the opening under the biasing force of the torsion spring 16', to a position where the sensing arm 11B' is restricted by a cover 93, indicated by the double-dotted line in FIG. 4. That is, the sensing arm 11B' projects across the transport region of the fan-folded form 20, under the biasing force of the torsion spring 16'.

Arranged below the pickup 11' is a crank bar 12' whose opposite ends are rotatably supported, respectively, by side plates 50 (only one shown) of the frame of the printer. Thus, the crank bar 12' is pivotally moveable about an axis extending perpendicularly to the transport direction of the fan-folded form 20.

A shutter arm 13' is mounted on the crank bar 12' for angular movement therewith, at a position adjacent the side plate 50.

The shutter arm 13' comprises a boss 13A fitted about the crank bar 12' and an arm section 13B extending from the boss 13A in a direction perpendicular to an axis thereof. A plate-like shutter 13C is formed at a forward end of the arm section 13B. The shutter 13C extends parallel to the arm section 13B in spaced relation thereto.

The crank bar 12' is biased to angularly move under the weight of the arm section 13B and the shutter 13C of the shutter arm 13'. The angular movement of the crank bar 12' is restricted by abutment of a central eccentric shaft section 12A' of the crank bar 12' against the push arm 11C' of the pickup 11', when, as indicated by the solid lines in FIG. 4, the sensing arm 11B' of the pickup 11' projects into the transport region of the fan-folded form 20, in other words, when the fan-folded form 20 is absent in the transport region. On the other hand, when the fan-folded form 20 is in the transport region above the pickup 11' so that the sensing arm 11B' of the pickup 11' is urged against the fan-folded form 20 and is angularly moved by the same as indicated by the double-dotted lines in FIG. 4, the restriction on the angular movement of the crank bar 12' due to the push arm 11C' is released so that the shutter arm 13' is pivotally moved to the position where the shutter arm 13' is abutted against a lower side of an opening 50A in the side plate 50 subsequently to be described. Thus, the shutter arm 13' is restricted in pivotal movement by the lower side of the opening 50A. In this connection, an angle of the angularly movement of the pickup 11; due to urging of the sensing arm 11B' by the fan-folded form 20, is larger than an angle of the pivotal movement of the shutter arm 13'. Accordingly, when the pickup 11' moves angularly to the double-dotted position illustrated in FIG. 4, the eccentric shaft section 12A' of the crank bar 12' is spaced a predetermined distance from the push arm 11C'.

That is, the shutter arm 13' follows the push arm 11C' under the own weight of the shutter arm 13' through the crank bar 12', within a pivotally moveable range of the shutter arm 13'. In other words, the shutter arm 13' is moved pivotally by the angular movement of the push arm 11C'.

The shutter 13C of the shutter arm 13' projects outwardly through the opening 50A in the side plate 50. The pivotal movement of the shutter arm 13' attendant upon the angular movement of the crank bar 12' causes the shutter 13C to be moved across a detecting region or area of a photo-interrupter 14'. The photo-interrupter 14' is fixedly mounted to a bracket 51 which, in turn, is fixedly mounted to the outer surface of the side plate 50 so as to extend perpendicularly thereto. When the aforesaid sensing arm 11B' projects into the transport region of the fan-folded form 20, the shutter 13C is out of the detecting region of the photo-interrupter 14'. On the other hand, when the sensing arm 11B' is urged against the fan-folded form 20 and is angularly moved by the same, that is, when the shutter arm 13' is so located as to be restricted by the lower side of the opening 50A, the shutter 13C is in the detecting region of the photo-interrupter 14', that is, the shutter 13C is detected by the photo-interrupter 14'.

In the skewing detection mechanism 10' constructed as above, when the fan-folded form 20 is in the normal transport state in which the fan-folded form 20 is located in position on the tractor belt unit 9', the sensing arm 11B' is urged by the fan-folded form 20 so that the pickup 11' is moved angularly against the biasing force of the torsion spring 16'. Thus, the sensing arm 11B' is retracted to a position below the upper surface 92 of the tractor belt unit 9', as indicated by the double-dotted lines in FIG. 4.

In this state, the restriction on the angular movement of the eccentric shaft section 12A' by the push arm 11C' is released so that the shutter arm 13' stops at the position, under its own weight, where the shutter arm 13' is restricted in movement by the lower side of the opening 50. At this time, the shutter 13C is in the position where the shutter 13C is detected by the photo-interrupter 14'. The state in which the shutter 13C is detected by the photo-interrupter 14' indicates that the fan-folded form 20 is transported regularly or normally.

If the fan-folded form 20 skews or is torn up so that the fan-folded form 20 no longer exists on the sensing arm 11B', the urging of the fan-folded form 20 against the sensing arm 11B' is released. At this time, the pickup 11' angularly moves under the biasing force of the torsion spring 16' in such a direction that the sensing arm 11B' projects into the transport region of the fan-folded form 20. By this angular movement, the push arm 11C' urges the eccentric shaft section 12A' of the crank bar 12' to move the eccentric shaft section 12A' angularly, that is, to move the crank bar 12' angularly, thereby moving the shutter arm 13' pivotally. As a result, the shutter 13C is out of the detecting region of the photo-interrupter 14'. Thus, the photo-interrupter 14' outputs a signal representative of the angular movement of the shutter 13C out of the detecting region of the photo-interrupter 14'. The signal from the photo-interrupter 14' serves as a transport-malfunction detecting signal.

As described above, for the skewing detection mechanism for the printer employing the continuous recording form, according to the invention, it is possible to detect skewing or meandering of the recording form quickly when such transport abnormality occurs, thereby enabling the printer to be stopped in printing and/or enabling occurrence of the transport abnormality to be displayed to inform a user of the fact.

What is claimed is:

1. A skewing detection mechanism for a printer of the type wherein an image is formed on a continuous recording form, said mechanism comprising:

pivotally moveable sensor means arranged in abutted and biased relation to said continuous recording form as said form is transported along a predetermined transport path;

means for detecting pivotal movement of said sensor means;

shaft means having an axis that extends perpendicularly to said predetermined transport path, said sensor means being mounted on said shaft means for pivotal movement about said axis;

spring means associated with said sensor means for biasing said sensor means in such a manner that said sensor means is abutted against said continuous recording form;

wherein said means for detecting is associated with said sensor means for detecting said pivotal movement of said sensor means about said axis of said shaft means under the biasing force of said spring means at the time that said sensor means is released from abutting against the continuous recording form;

said sensor means includes a pair of sensor elements mounted on said shaft means for pivotally moving about said axis of said shaft means in spaced relation to each other along said shaft means, and said spring means includes a pair of spring members associated, respectively, with said pair of sensor elements, said pair of sensor elements being respectively abutted against opposite side edge portions of said continuous recording form under the biasing forces of said spring members such that when at least one of said pair of sensor elements is released from abutting against a corresponding one of said opposite side edge portions of said continuous recording form and is pivotally moved about said axis of said shaft means under the biasing force of a corresponding one of said spring members, said detecting means detect said pivotal movement of said sensor element to output a signal that is representative of the occurrence of a transport abnormality of said continuous recording form;

each of said pair of sensor elements includes a boss mounted on said shaft means and a first arm that extends from said boss, said first arm having a free end face, a part of said end face being abutted against a corresponding one of said opposite side edge portions of said continuous recording form under the biasing force of a corresponding one of said pair of spring members, while a remaining part of said free end face extends outwardly from a side edge of said corresponding side edge portion of the continuous recording form;

said means for detecting includes a moveable element and a detector for detecting movement of said moveable element and means for transmitting said pivotal movement of at least one of said pair of sensor elements to said moveable element of said detecting means, wherein pivotal movement of said at least one sensor element is transmitted to said moveable element of said detecting means through said transmission means so as to move said moveable element; said moveable element of said detecting means comprises a shutter plate, and said detector comprises a photointerrupter, said shutter plate being moveable between an inoperative position within a detecting region of said photointerrupter and an operative position out of said detecting region thereof, wherein said shutter plate is normally in said inoperative position, while when said shutter plate is moved to said operative position, said photointerrupter outputs a signal indicative of the occurrence of an abnormality in transporting said continuous recording form; and wherein in each sensor element further includes a second arm projecting from said boss of said sensor element in a direction that is substantially opposite to that in which said first arm of said sensor element extends from said boss, said transmission means including a crank bar comprising opposite axial end portions having their common axis extending perpendicularly to said predetermined transport path and an eccentric shaft section extending between said opposite axial end portions, said shutter plate being mounted on one of said opposite axial end portions of said crank bar for pivotally moving about said common axis, said eccentric shaft section resting upon said second arms of respective sensor elements, wherein said pivotal movement of at least one of said pair of sensor elements causes said second arms to move said crank bar angularly about said common axis, thereby angularly moving said shutter plate from said inoperative position to said operative position.

2. A skewing detection mechanism for a printer of the type wherein an image is formed on a continuous recording form, said mechanism comprising:

pivotally moveable sensor means arranged in abutted and biased relation to said continuous recording form as said form is transported along a predetermined transport path;

means for detecting pivotal movement of said sensor means;

said sensor means being pivotally moveable about an axis extending perpendicularly to said predetermined path, said skewing detecting mechanism further comprising spring means associated with said sensor means for biasing said sensor means in such a manner that said sensor means is abutted against said continuous recording form, said detecting means being associated with said sensor means for detecting pivotal movement of said sensor means about said axis under biasing force of said spring means at the time said sensor means is released from abutting against said continuous recording form;

said sensor means including a pair of sensor elements arranged for pivotally moving about said axis in spaced relation to each other along said axis, said spring means having a pair of spring members associated with said pair of sensor elements, said pair of sensor elements being positioned to abut, respectively, against opposite side edge portions of said continuous recording from under biasing forces of the respective spring members, such that when at least one of said pair of sensor elements is released from abutting against a corresponding one of said opposite side edge portions of the continuous recording form and is pivotally moved about said axis under the biasing force of a corresponding one of said spring members, said detecting means detects the pivotal movement of the sensor element so as to output a signal that is representative of the occurrence of an abnormality in transporting the continuous recording form;

each of said pair of sensor elements comprising a boss arranged for angularly about said axis and a first arm that extends from said boss, said first being abutted against a corresponding one of said opposite side edge portions of said continuous recording form under the biasing force of a corresponding one of said pair of spring members;

said detecting includes a moveable element and a detector for detecting means movement of said moveable element, said skewing detecting mechanism further comprising means for transmitting the pivotal movement of at least one of said pair of sensor elements to said moveable element of said detecting means, wherein pivotal movement of the at least one sensor element is transmitted to said moveable element of said detecting means through said transmission means so as to move said moveable element;

said moveable element of said detecting means comprising a shutter arm having a shutter, said detector of said detecting means comprising a photointerrupter, said shutter arm being moveable between an inoperative position where said shutter is within a detecting region of said photointerrupter and an operative position where said shutter is out of said detecting region, the arrangement being such that said shutter arm is normally in said inoperative position, while when said shutter arm is moved to said operative position, said photointerrupter outputs a signal that is indicative of the occurrence of an abnormality in transporting the continuous recording form; and wherein each of said sensor elements further comprises a second arm projecting from said boss of said sensor element in a direction that is substantially opposite to that which said first arm of said sensor element extends from said boss, wherein such transmission means includes a crank bar that is angularly moveable about a second axis that extends perpendicularly to said predetermined transport path, said crank bar having an eccentric shaft section, said shutter arm being moveable about said second axis, said eccentric shaft section being engageable with said second arm of said respective sensor elements, the arrangement being such that said pivotal movement of at least one of said pair of said sensor elements causes that second arm to angularly move said crank bar about said second axis, thereby angularly moving said shutter arm about said second axis from said inoperative position to said operative position.

3. The skewing detection mechanism according to claim 2, wherein when said shutter arm is in said inoperative position, said eccentric shaft section of said crank bar is spaced a predetermined distance from the second arms of the respective sensor elements.

4. A skew detection mechanism for a continuous web transported in a predetermined direction, said mechanism comprising:

means for sensing the web, said means positioned in abutting relation to the web;

means for mounting, said means for sensing the web, for movement in response to movement of the web in a direction substantially transverse to the predetermined direction;

means for detecting movement of said means for sensing; and means for transmitting movement of said means for sensing to said means for detecting, wherein said means for mounting permits movement of said means for sensing in a transverse direction, independently of said means for transmitting.

5. A skew detection mechanism according to claim 4, wherein the continuous web comprises a continuous recording form for a printer, and on which an image is formed.

6. A skew detection mechanism according to claim 4, wherein said means for sensing are mounted for pivotal movement about a shaft extending transverse to the predetermined direction.

7. A skew detection mechanism according to claim 4 wherein said means for mounting comprises a shaft, said means for sensing pivoting about said shaft.

8. A skew detection mechanism according to claim 4, wherein said means for sensing comprises a pair of pivotally mounted sensor elements, said mechanism further comprising means for biasing said sensors into abutting relation against the web.

9. A skew detection mechanism according to claim 4, wherein said means for sensing are mounted for pivotal movement in response to web movement about a shaft extending transverse to the predetermined direction, and said means for sensing are further mounted for sliding movement along said shaft.

10. A skewing detection mechanism for a continuous web comprising:

a shaft having an axis that extends generally perpendicularly to a predetermined web transport path;

means for sensing movement of the transport web arranged in abutted and biased relation to the continuous web as the web is transported along the predetermined web transport path, said means for sensing comprising a plurality of sensors mounted for pivotal movement about said shaft, and at least one of said plurality of sensors being adjustably moveable along said shaftf means for biasing associated with said plurality of sensors for biasing said plurality of sensors against the continuous web;

means for detecting pivotal movement of said sensors;

means for transmitting pivotal movement of at least one of said sensors to said detecting means, said transmitting means extending in a direction generally perpendicularly to the web transport path and fixed against movement in a direction perpendicular to said web transport path;

said plurality of sensors bearing against said means for transmitting under the bias of said biasing means; and wherein said at least one adjustably moveable sensor is moveable along said shaft independently of said transmitting means and said detecting means.

11. The skew detection mechanism according to claim 24, wherein each of said plurality of sensors comprises a sensor element each abutted against a corresponding opposite edge portion of the continuous web under the action of said biasing means such that absence of an opposite edge portion will cause biased pivotal movement of the corresponding sensor element.

12. The skew detection mechanism according to claim 11, wherein said detecting means detects said pivotal movement of said sensor elements to output a signal that is representative of the occurrence of a transport abnormality of the continuous web.

13. The skew detection mechanism according to claim 12, wherein each of said sensor elements includes a boss mounted on said shaft and a first arm that extends from said boss, said first arm having a free end face, a part of said end face being abutted against a corresponding one of said opposite side edges of the continuous web under the action of said biasing means while a remaining part of said free end face extends outwardly from a side edge of said corresponding side edge portion of the continuous web.

14. The skewing detection mechanism according to claim 13, wherein said detecting means includes a moveable element and a detector for detecting movement of said moveable element, wherein said moveable element is coupled to said transmission means.

15. The skewing detection mechanism according to claim 14, wherein said moveable element of said detecting means comprises a shutter plate, and said detecting means comprises a photointerrupter, said shutter plate being moveable between an inoperative position within a detecting region of said photointerrupter and an operative position out of said detecting region of said photointerrupter, wherein said shutter plate is normally in said inoperative position, while once said shutter plate is moved to said operative position, said photointerrupter outputs a signal indicative of the occurrence of an abnormality in transporting the continuous web.

16. The skewing detection mechanism according to claim 15, wherein each of said sensor elements further includes a second arm projecting from said boss of said sensor element in a direction that is substantially opposite to that in which said first arm of said sensor element extends from said boss, said transmitting means including a crank bar comprising opposite axial end portions having their common axis extending generally perpendicularly to said predetermined transport path and an eccentric shaft portion extending between said opposite axial end portions, said shutter plate being mounted on one of said opposite axial end portions of said crank bar for pivotally moving about said common axis, said eccentric shaft section resting upon said second arms of said respective sensor elements, wherein said pivotal movement of at least one of said pair of sensor elements causes said second arm to move said crank bar angularly about said common axis, thereby angularly moving said shutter plate from said inoperative position to said operative position.

17. The skewing detection mechanism according to claim 10, wherein said transmitting means includes a bar having axial end portions and an eccentric central portion, wherein said sensors bear against said eccentric central portion and said detecting means is coupled to one of said axial end portions.

18. The skew detection mechanism according to claim 10, wherein each of said sensors includes a sensor element arranged for pivotally moving about said shaft, and in spaced relation to each other along said shaft, wherein at least one of said sensor elements is slidable along said shaft so that the distance between said sensor elements can be adjusted so as to be matched with continuous webs of a variety of widths.

* * * * *

UNITED STATES PATENT AND TRADEMARK OFFICE
CERTIFICATE OF CORRECTION

PATENT NO. : 4,987,448
DATED : January 22, 1991
INVENTOR(S) : Atsushi CHIKAMA

It is certified that error appears in the above-indentified patent and that said Letters Patent is hereby corrected as shown below:

On the cover page, at section [57], lines 1-2 under Abstract, insert ---is provided in which--- after "printer".
On the cover page, at section [57], lines 1-2 under Abstract, delete "of type wherein" after "printer".
On the cover page, at section [57], line 2 under Abstract, change "onto" to ---on---.
On the cover page, at section [57], line 4 under Abstract, delete "recording".
On the cover page, at section [57], line 5 under Abstract, insert ----that is--- after "form".
On the cover page at section [57], line 5 under Abstract, delete "transport".
On the cover page, at section [57], line 6 under Abstract, after "path", change ". A" to ---, and a---.
At column 12, line 15 (claim 2, line 49), insert ---means--- after "detecting".
At column 13, line 45 (claim 10, line 12), change "shaftf" to ---shaft;---.
At column 13, line 64 (claim 11, line 2), change "24" to ---10---.

Signed and Sealed this

Twenty-eight Day of March, 1995

BRUCE LEHMAN

Attest:

Attesting Officer

Commissioner of Patents and Trademarks